(12) United States Patent
Carter

(10) Patent No.: US 8,958,790 B2
(45) Date of Patent: Feb. 17, 2015

(54) MANAGEMENT OF MACRO NETWORK KPI IMPACTS FOR A MASS DEPLOYMENT OF FEMTOCELLS

(75) Inventor: Alan James Auchmuty Carter, Swindon (GB)

(73) Assignee: Uniquisys Limited, Swindon (GB)

( * ) Notice: Subject to any disclaimer, the term of this patent is extended or adjusted under 35 U.S.C. 154(b) by 151 days.

(21) Appl. No.: 13/643,988

(22) PCT Filed: Apr. 21, 2011

(86) PCT No.: PCT/GB2011/050804
§ 371 (c)(1),
(2), (4) Date: Mar. 4, 2013

(87) PCT Pub. No.: WO2011/135342
PCT Pub. Date: Nov. 3, 2011

(65) Prior Publication Data
US 2013/0171985 A1    Jul. 4, 2013

(30) Foreign Application Priority Data

Apr. 30, 2010    (GB) .................................. 1007268.4

(51) Int. Cl.
*H04W 88/02* (2009.01)
*H04W 52/24* (2009.01)
(Continued)

(52) U.S. Cl.
CPC ............. *H04W 52/244* (2013.01); *H04W 52/24* (2013.01); *H04W 52/228* (2013.01); *H04W 52/283* (2013.01); *H04W 52/287* (2013.01); *H04W 52/343* (2013.01)
USPC ......................................... 455/423

(58) Field of Classification Search
USPC ............... 455/423, 452.1, 436–440; 713/156; 709/217; 370/235, 328
See application file for complete search history.

(56) References Cited

U.S. PATENT DOCUMENTS

| 8,369,859 B2 | 2/2013 | Claussen et al. |
| 2007/2780151 | 11/2007 | Holger |

(Continued)

FOREIGN PATENT DOCUMENTS

| CN | 101449606 A | 6/2009 |
| EP | 2 152 041 | 2/2010 |

(Continued)

OTHER PUBLICATIONS

UK Search and Examination Report dated Oct. 8, 2013 for UK Application No. GB1007268.4.

(Continued)

*Primary Examiner* — Diane Mizrahi
(74) *Attorney, Agent, or Firm* — Weaver Austin Villeneuve & Sampson LLP

(57) ABSTRACT

Power management is provided in a femtocell basestation in a cellular communications network, in order to ensure that the effect of a mass deployment of femtocells on the key performance indicators of the surrounding macro network is bounded, for all femtocell traffic profiles. An expected area density of femtocells is determined; a macro layer quality criterion is set; a network performance indicator impact level is set; a maximum impact area allowed for the femtocell is calculated, based on the expected area density of femtocells, the macro layer quality criterion, and the network performance indicator impact level; a distance of a macro layer user from the femtocell is estimated; and the downlink power in the femtocell is controlled, based on the estimated distance of the macro layer user from the femtocell and based on the calculated maximum impact area.

20 Claims, 4 Drawing Sheets

(51) Int. Cl.
    *H04W 52/22*     (2009.01)
    *H04W 52/28*     (2009.01)
    *H04W 52/34*     (2009.01)

(56) References Cited

U.S. PATENT DOCUMENTS

| | | | |
|---|---|---|---|
| 2009/0042593 A1 | 2/2009 | Yavuz | |
| 2009/0280853 A1 | 11/2009 | Brisebois | |
| 2009/0285143 A1 | 11/2009 | Kwun et al. | |
| 2011/0105200 A1 | 5/2011 | Tomita et al. | |
| 2013/0064197 A1* | 3/2013 | Novak et al. | 370/329 |
| 2013/0294240 A1* | 11/2013 | Suni | 370/235 |
| 2013/0297729 A1* | 11/2013 | Suni et al. | 709/217 |
| 2013/0297934 A1* | 11/2013 | Suni et al. | 713/156 |

FOREIGN PATENT DOCUMENTS

| | | |
|---|---|---|
| GB | 2 472 463 | 2/2011 |
| WO | WO 2010/016123 | 2/2010 |
| WO | WO 2010/036180 | 4/2010 |
| WO | WO 2010/049119 | 5/2010 |

OTHER PUBLICATIONS

International Search Report and the Written Opinion of the International Searching Authority dated Nov. 2, 2011, International Application No. PCT/GB2011/050804 (19 page).
Arulselvan, et al., "Distributed Power Control Mechanisms for HSDPA Femtocells", the Institution of Engineering and Technology, IEEE 69$^{th}$ Vehicular Technology Conference, Apr. 26, 2009, Barcelona, Spain.
Alcatel-Lucent: "Simulation Results of Macro-Cell and Co-Channel Home NodeB With Power Configuration and Open Access", 3GPP Draft: R4-071578, 3$^{rd}$ Generation Partnership Project (3GPP), vol. RAN WG4, No. Shanghai, China, Oct. 16, 2007.
UK Examination Report dated Mar. 26, 2013 for GB1007268.4.
JP Office Action dated Oct. 31, 2014 for JP Application No. 2013-506748.
CN Office Action dated Dec. 10, 2014 for CN Application No. 201180030155.4.
Arulselvan, N. et al., "Distributed Power Control Mechanisms for HSDPA Femtocells", 2009 IEEE 69$^{th}$ Vehicular Technology Conference, Apr. 26, 2009, 5 pages.

* cited by examiner

MANAGEMENT OF MACRO NETWORK KPI IMPACTS FOR A MASS DEPLOYMENT OF FEMTOCELLS

This invention relates to a method of power management, for example for use in a femtocell basestation in a cellular communications network, and to a basestation using the method, the aim being to ensure that the effect of a mass deployment of femtocells on the key performance indicators of the surrounding macro network is bounded, for all femtocell traffic profiles.

Femtocell basestations are in use in many cellular networks. A femtocell basestation is a basestation that may be provided for residential use. That is, the device is located in the premises of a cellular subscriber, and connects in to the core network of the cellular network operator by means of an existing broadband connection. Then, the device provides cellular network coverage for the subscriber within and very close to the premises. It is recognised that, when a femtocell basestation is introduced into a cellular network, this can potentially cause interference with any macrolayer basestation that is using the same frequency carrier to provide coverage for the area containing the residential premises. When the femtocell basestation is a closed access device, which only registered subscribers can use, this interference can adversely affect the ability of the network to provide coverage for other network subscribers. Therefore, techniques are known for controlling the power of signals transmitted by the femtocell basestation, and of signals transmitted to the femtocell basestation by macro network connected devices, in order to reduce that interference.

Issues remain as to how a network operator can ensure that a population of femtocell basestations does not impact the key performance indicators (e.g. percentage of dropped calls, or capacity) of the macrolayer of the cellular network beyond a certain bound, irrespective of the on air traffic profile on the femtocell.

According to a first aspect of the present invention, there is provided a method of controlling a downlink power in a femtocell, the method comprising:
 determining an expected area density of femtocells;
 setting a macro layer quality criterion;
 setting a network performance indicator impact level;
 calculating a maximum impact area allowed for the femtocell, based on the expected area density of femtocells, the macro layer quality criterion, and the network performance indicator impact level;
 estimating a distance of a macro layer user from the femtocell; and
 controlling the downlink power in the femtocell based on the estimated distance of the macro layer user from the femtocell and based on the calculated maximum impact area.

According to a second aspect of the present invention, there is provided a method of controlling a downlink power in a femtocell, the method comprising:
 when the femtocell stops carrying any traffic, reducing the downlink power of the femtocell to a resting power level after a time threshold has expired,
 the method further comprising the step of:
 setting the time threshold based on an activity level of the femtocell.

According to a third aspect of the present invention, there is provided a femtocell basestation, adapted to control its downlink power according to the method of the first or second aspect.

For a better understanding of the present invention, and to show how it may be put into effect, reference will now be made, by way of example, to the accompanying drawings, in which:

FIG. 1 shows a part of a cellular communications network 10. It will be apparent that FIG. 1 shows only a small part of a typical network, sufficient for an understanding of the present invention.

Figure 1:
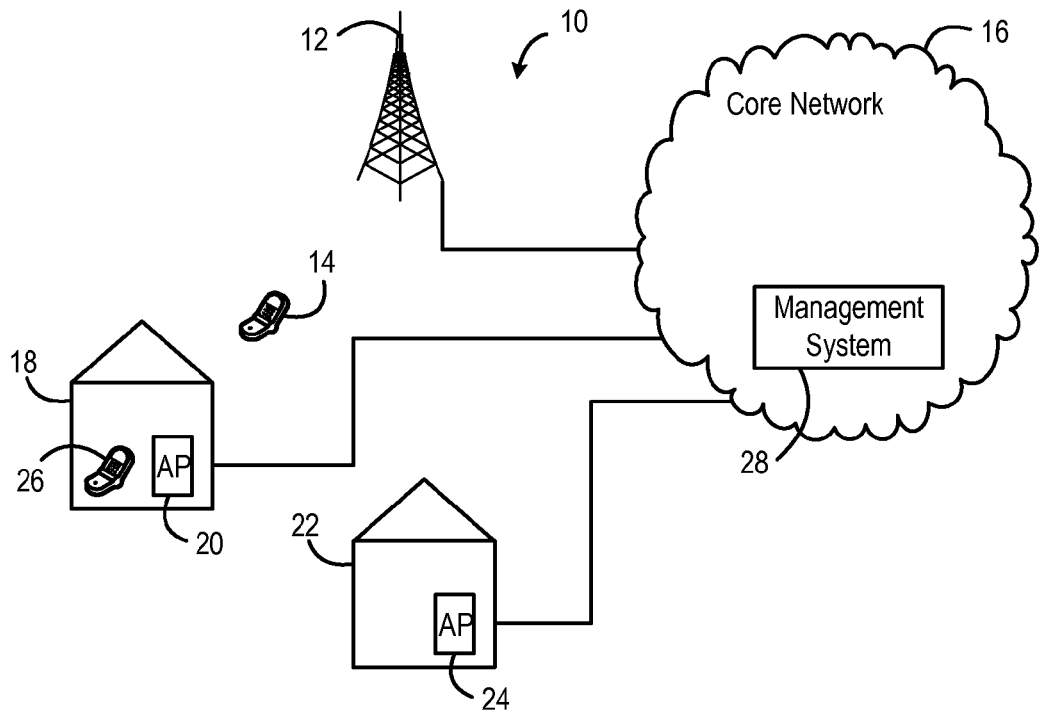
FIG. 1 is a schematic diagram, illustrating a part of a cellular network operating in accordance with an aspect of the invention.

FIG. 1 shows a macrolayer basestation 12 in the cellular network 10. As is conventional, a user equipment such as the cellular phone 14, that is within the coverage area of the macrolayer basestation 12 can establish a connection with the basestation. The macrolayer basestation 12 is connected to a core network 16 of the cellular network 10, and data can be transmitted over the core network 16 between basestations in the cellular network 10 and into the public telephone network.

FIG. 1 also shows a first residential building 18 in which is located a first femtocell basestation, or access point (AP) 20, and a second residential building 22 in which is located a second femtocell basestation, or access point (AP) 24. The buildings 18, 22 are located in the coverage area of the macrolayer basestation 12, meaning that user equipments in or close to the buildings 18, 22 should be able to receive coverage from the macrolayer basestation 12. However, it is known that coverage can be problematic within buildings, particularly at the frequencies that are often used in Universal Mobile Telecommunications System (UMTS) networks. The presence of a femtocell basestation within the premises therefore improves the network coverage there. Thus, a user equipment such as the cellular phone 26 within the building 18 can receive cellular coverage from the first femtocell basestation 20.

FIG. 1 also shows a management system 28 within the core network 16 of the cellular network 10. The management system 28 controls certain aspects of the operation of the femtocell basestations 20, 24, as described in more detail below.

Figure 2:
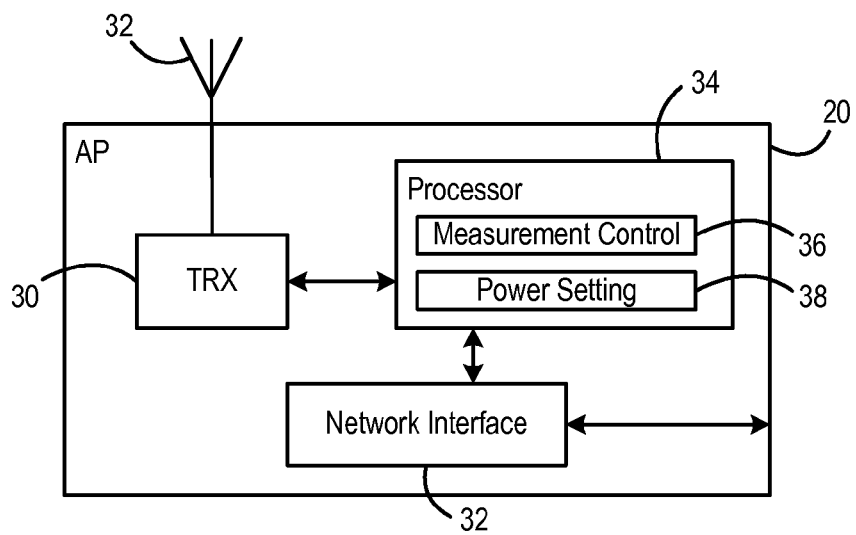
FIG. 2 is a schematic diagram illustrating in more detail the form of a femtocell basestation in accordance with an aspect of the invention.

FIG. 2 shows in more detail the structure of the femtocell basestations, such as the first femtocell basestation, or access point (AP) 20. The access point 20 includes radio transceiver (TRX) circuitry 30, and an antenna 32, for communication over the air interface with user equipments such as the cellular phone 26. The access point 20 also includes a network interface 32, for communicating with the core network 16 of the cellular network, for example over an existing broadband IP network connection.

Operation of the access point 20 is controlled by a processor 34. For example, the access point 20 is able to make measurements on signals received from other nearby basestations, and is able to receive measurement reports from connected user equipments, and the processor 34 includes a measurement control block 36 for determining which measurements are required, and for interpreting the measurement results. In addition, the access point is able to control the power of its downlink transmissions, and is able to send commands to connected user equipments, in order to control the power of the uplink transmissions from those user equipments, and the processor 34 includes a power setting block 36 for determining the power settings.

Figure 3:
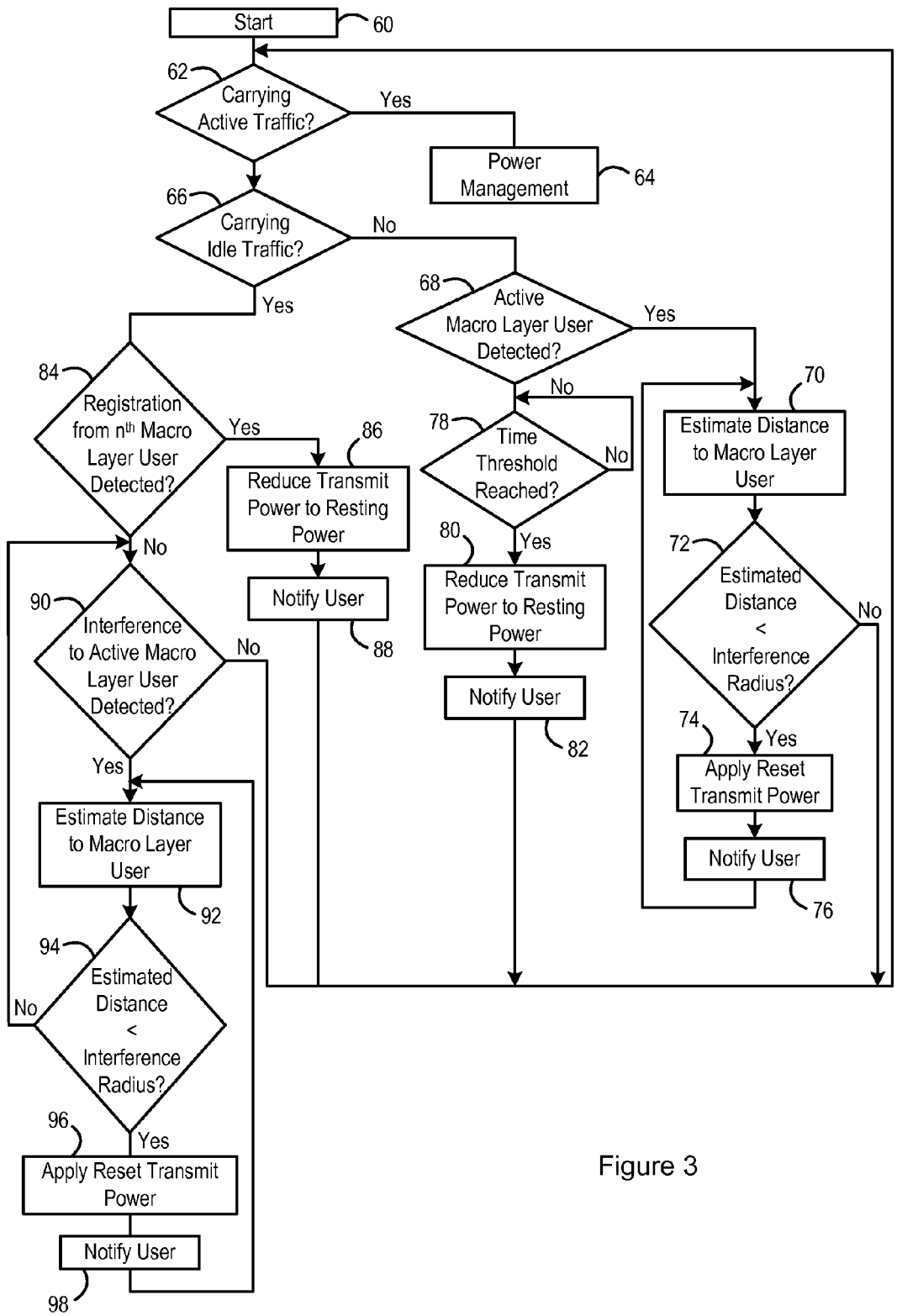
FIG. 3 is a flow chart, illustrating a process in accordance with an aspect of the invention.

A process for managing the possibility of interference caused by the femtocell basestations 20, 24 is illustrated in FIG. 3. The process is described with reference to its performance in the first femtocell basestation 20, but it is intended that the same process might be performed in each of the femtocells in the network. In this illustrated embodiment, the invention is concerned with the situation in a closed access femtocell, that is, one that only registered subscribers can use, although in principle the same ideas can be used in open access femtocells.

The process starts in step 60, and in step 62 it is determined whether the femtocell is carrying any active traffic. If it is determined in step 62 that the femtocell is carrying active traffic, the process passes to step 64, in which the usual power management algorithms are used. This is on the basis that, if a femtocell is carrying active traffic, it is removing traffic from the macro layer basestations, and any reduction in capacity caused by interference from the femtocell is likely to be more than compensated by the increase in capacity caused by this removal of traffic.

If it is determined in step 62 that the femtocell is not carrying active traffic, the process passes to step 66, in which it is determined whether the femtocell is carrying any idle traffic.

If the femtocell is not carrying any idle traffic, the process passes to step 68. In step 68, it is determined whether the femtocell is able to detect any active user on the surrounding macro layer.

If it is determined in step 68 that the femto cell is interfering with a local active macro layer user then, for as long as it is impacting the network performance towards the macro layer user, which may be as long as it takes for the macro layer user to walk past the residence 18 containing the femto cell 20, it should reduce its transmit power to within degradation limits that are set on the basis of permitted effects on certain key performance indicators (KPIs) of the macro network.

In step 70, the femtocell estimates the distance to the macro layer user. In step 72, the femtocell determines whether this distance is less than an interference radius. If the distance to the macro layer user is not less than the interference radius, the process returns to step 62. However, if the distance to the macro layer user is less than the interference radius, the process passes to step 74, in which it resets (or decreases) its transmit power, and then to step 76, in which the femtocell owner is notified, so that they can take remedial action by relocating the femtocell to a more suitable location not subject to interference, before returning to step 70, in which the distance to the macro layer user is estimated again, and this sub-process continues until the possibility for an adverse effect on the macro layer user is removed, for example because the macro layer user has moved further away from the femtocell 20. This sub-process containing steps 70, 72, 74 and 76 is described in more detail below.

If it is determined in step 68 that there is no active macro layer user nearby, there is still a possibility that the population of femto cells could together have a noticeable adverse affect on the network capacity. Thus, in step 78, it is determined whether a time threshold has been reached. When this threshold is reached, the process passes to step 80, in which the transmit power is reduced to a resting power level and, in step 82, the user is notified of the situation, before the process returns to step 62. This sub-process containing steps 78, 80 and 82 is described in more detail below.

If it is determined in step 66 that the femtocell is carrying idle traffic, the process passes to step 84. In step 84, it is tested whether the femtocell might be causing interference to idle macro layer users. Specifically, the femtocell gathers the statistics of the number of registration rejections that it issues to macro layer UEs. If, for example, only a single macro layer user attempts to register on the femto cell, this might be ignored. However if the number of registration attempts by macro layer users reaches a threshold number, n, within a predefined time period (and the value of n might, for example be set to 2) then it could be concluded that the particular femto cell is causing additional interference. In that case, the process passes to step 86, in which the maximum down link transmit power is limited to the resting transmit power level mentioned above, and as described in more detail below. In step 88, the user is notified, and then the process returns to step 62.

If it is determined in step 84 that the umber of rejected registration requests has not reached the threshold number, the process passes to step 90. In step 90, it is determined whether the femto cell is interfering with a local active macro layer user. If so, then, for as long as it is impacting the network performance towards the macro layer user, which may be as long as it takes for the macro layer user to walk past the residence 18 containing the femto cell 20, it should reduce its transmit power to within degradation limits that are set on the basis of permitted effects on certain key performance indicators (KPIs) of the macro network.

In step 92, the femtocell estimates the distance to the macro layer user. In step 94, the femtocell determines whether this distance is less than an interference radius. If the distance to the macro layer user is not less than the interference radius, the process returns to step 90. However, if the distance to the macro layer user is less than the interference radius, the process passes to step 96, in which it resets its transmit power to a value that defines an interference boundary, and then to step 98, in which the user is notified, before returning to step 92, in which the distance to the macro layer user is estimated again, and this sub-process continues until the possibility for an adverse effect on the macro layer user is removed, for example because the macro layer user has moved further away from the femtocell 20. This sub-process containing steps 92, 94, 96 and 98 is described in more detail below.

More specifically, this sub-process containing steps 92, 94, 96 and 98 may be effectively the same as the sub-process containing steps 70, 72, 74 and 76, mentioned above.

As described above, in both step 70 and step 92, the femtocell estimates the distance of the macro layer user from the femtocell. This estimation is illustrated in FIGS. 4 and 5, and described in more detail below.

Figure 4:
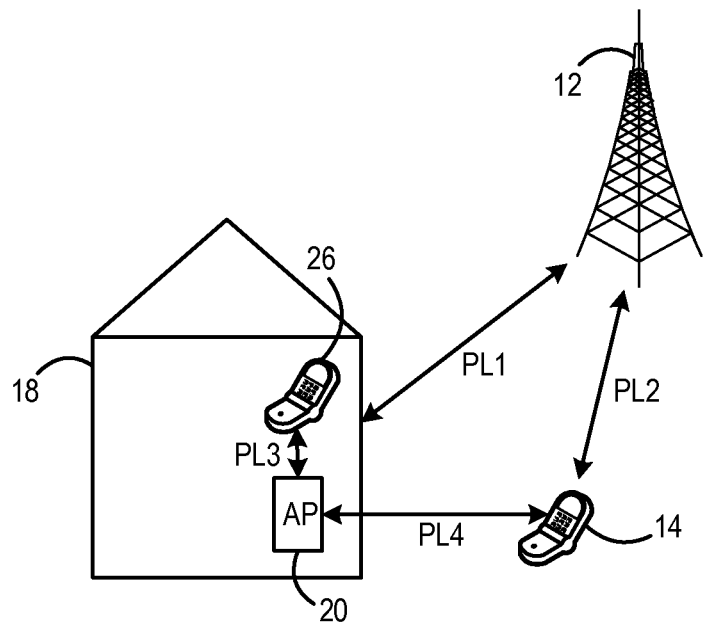
FIG. 4 illustrates in more detail a part of the network shown in FIG. 1.
Figure 5:
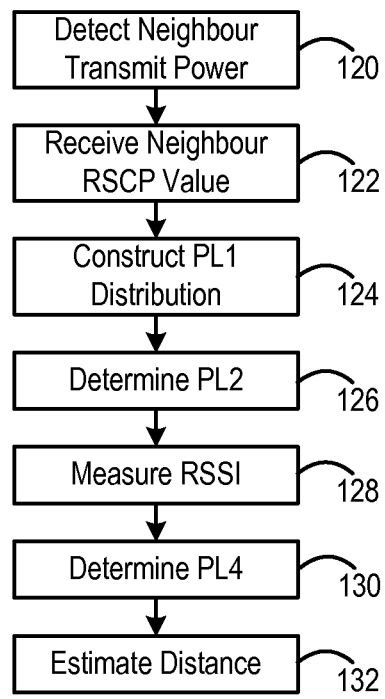
FIG. 5 is a flow chart, illustrating in more detail a part of the process of FIG. 3.

FIG. 4 shows a part of the network illustrated in FIG. 1, in the situation where the UE 26 is located in the same building 18 as the femtocell 20, and the UE 14, which is active on the macro layer basestation 12, is close to the femtocell 20, for example either just outside the building 18, or in different residential or business premises within the building 18. The distance of the macro layer user 14 from the femtocell 20 is estimated on the basis of an estimation of the path loss between the macro layer user 14 and the femtocell 20. This in turn can be estimated using knowledge of other path losses, even though there is no communications link between the macro layer user 14 and the femtocell 20.

The first path loss, PL1, is the path loss between the macro layer basestation 12 and the coverage area of the femtocell 20. This path loss varies over the coverage area of the femtocell 20, as will be described in more detail below.

The second path loss, PL2, is the average path loss between the macro layer basestation 12 and the macro layer UE 14 when it is close to the femtocell 20.

The third path loss, PL3, is the path loss between the femtocell 20 and the femtocell UE 26.

The fourth path loss, PL4, is the estimate of the path loss between the femtocell 20 and the macro layer user 14, that is used in estimating the distance between them.

Under normal access point operation, with outer loop power control and inner loop power control working, the femtocell will measure a Received Total Wideband Power (RTWP) due to its own UEs, at a level just above its typical noise floor. This measured RTWP will increase when a macro layer UE is nearby. The femtocell 20 may be deployed using the same carrier frequency, i.e. the same UMTS Terrestrial Radio Access (UTRA) Absolute Radio Frequency Channel Number (UARFCN) as a nearby macro layer basestation 12. In the case where the network operator has two carriers, an alternative option is to deploy femtocells, such as the femtocell 20 in the guard band area straddling the two carriers, and in that case it would be expected that the measured RTWP noise rise would be smaller.

Regardless of the frequency on which the femtocell 20 is deployed, the noise will increase, the closer the user approaches the femtocell, until the user enters the 'femtocell deadzone' and at this point the user's macrolayer call is dropped or is handed over to another UMTS carrier or the 2G network.

FIG. 5 is a flow chart, illustrating the process for estimating the distance of the macro layer user 14 from the femtocell 20. By measuring the uplink noise rise at the Femto Cell caused by the Macro Layer UE and through the femto cell listen mode and femto cell UE measurements it is possible (before the call is dropped or handed over) to estimate the Macro Layer UE transmit power and hence estimate the path loss (path loss 4) between the femto cell and the Macro Layer UE even although there is no physical communications link between these two devices.

As is known, the femtocell can detect signals transmitted by all macro layer neighbour cells, and in particular in step 120 of the process can decode the scrambling codes and Common Pilot Channel (CPICH) transmit power values from the System Information Block (SIB) information transmitted by the surrounding macro layer nodeB's. Also, when in active mode, the femtocell UE is also reporting to the femtocell the detected CPICH Received Signal Code Power RSCP levels of the surrounding macro layer nodeB neighbours. In step 122, the femtocell 20 receives these measurement values, and this process can take place over the whole period of use of the femtocell 20. From the transmit power value and the RSCP value, an instantaneous value of the path loss PL1 can be determined, allowing the construction in step 124 of a distribution over time of the path loss between the macro layer basestation 12 and the coverage area of the femtocell 20. The distribution might for example be calculated over a period of tens of seconds, although in general more accurate results will be obtained by using a larger number of instantaneous values.

It is then assumed that the femtocell UE 26 will probably pass close to the windows of the building 18 at some point in its use, and that the path loss from the macro layer basestation to a UE just inside the windows of the building 18 will be substantially the same as the path loss from the macro layer basestation to a UE just outside the building 18. Thus, in step 126 of the process, the average value of the second path loss, PL2, experienced by the nearby macro layer user 14 is assumed to be approximately the same as the value of PL1 that occurs only rarely, for example the lowest 1 or 2% of the first path loss value.

Values of the second path loss, PL2, can be calculated for all macro network neighbours on the same frequency as used by the femto cell 20, or on an alternative (typically adjacent frequency) carrier using the same procedure.

Since the value of PL2 for the macro layer user 14 has now been estimated, and knowing the typical noise floor of the nodeB 12, and assuming that the macro layer user 14 is using a 12k2/voice service having a known energy per bit to noise power spectral density ratio Eb/No, the average transmit (Tx) power of the macro layer UE 14 can be estimated, given an assumed value for the processing gain Gp, as follows:

$$\text{Average macro layer UE Tx power}=PL2+\text{nodeB noise floor}-Gp+EbNo$$

This estimation will be reasonably accurate, because the macro layer UE 14 will be in the far field of the macro layer nodeB 12, where the path loss variation with position will be small.

Making the assumption that the UE 14 is using the 12k2 service in this calculation will give the lowest possible result for the average macro layer UE Tx power, and hence the following calculation will give the smallest possible values in the PL4 distribution. This could result in underestimating the value of PL4, and hence over-emphasizing the effect of the macro layer UE interference, so this process is safe, in that respect. Furthermore it is expected that the Macro Layer UE will be connected to the nodeB to which there is the smallest path loss, and therefore transmitting at the lowest possible power, hence this is another factor that over-emphasizes the effect of the macro layer interference.

Once the average macro layer UE Tx power has been estimated then, in step 128, the femtocell 20 measures the short term received signal strength indicator (RSSI) distribution, for transmissions from the UE 14. This in turn allows the path loss short term distribution from the macro layer UE 14 to the femtocell 20 to be estimated as follows in step 130:

$$\text{Path Loss 4 distribution}=\text{Average Macro Layer UE Tx power}+RSSI\text{ distribution}.$$

In step 128, the RSSI distribution can either be measured as an ongoing Up Link operation on the carrier that the femtocell is deployed. For example, a sample could be taken once every 10 milliseconds, allowing a fast reaction to the possibility of any possible interference effects, particularly for a macro layer UE user walking past the building 18.

If the femtocell is deployed on a separate carrier from the macro layer nodeB, the possibility of negative impacts on the network KPI is greatly reduced, but the RSSI can still be measured on the adjacent channel by using the fast scanning of the femtocell. In this mode, the femtocell typically scans to the adjacent carrier for about 10 msec every 10-60 seconds and captures a frame of UL data. The sampling profile can be varied, depending on the traffic profile of the femtocell. For example, if there is no traffic on the femtocell the adjacent carrier could be scanned for 10 ms every 5 seconds, while, if there is traffic on the femtocell, the adjacent carrier could be scanned for 10 ms every 30 seconds, for example. These data snap shots are then used to calculate the RSSI. Multiple scans can be used to build up a short term histogram of the RSSI measurements on the adjacent frequency.

Once the path loss between the femtocell 20 and the macro layer user 14 has been estimated, this can be used in step 132 to estimate the distance between the femtocell 20 and the macro layer user 14. In this illustrated embodiment, this estimation uses an ITU1238 path loss model as shown in the following table:

| Path Loss (dB) | Distance between femtocell and macro layer user (m) |
|---|---|
| 51 | 3 |
| 60 | 6 |
| 65 | 9 |
| 69 | 12 |
| 71 | 15 |

Different path loss models could be applied (e.g. free space) in the alternative.

The value of the third path loss, PL3, which is the path loss between the femtocell user(s) 26 and the femtocell 20 can be accurately estimated at all times, because the UE 26 constantly reports back to the femtocell 20 the detected RSCP level as measured at the UE. The femtocell knows its transmitted power level, and hence the difference between the femtocell CPICH transmitted power level and the detected RSCP will be the path loss, PL3, between the femtocell UE 26 and the femtocell 20. Since it can be assumed that the user will move around the expected coverage area, a statistical distribution of this path loss can be determined and in particular the 90% to 95% indoor path loss value.

Furthermore if the 90% to 95% value of the PL4 distribution was found to be significantly less than the 90% to 95% value of the PL3 distribution, then it could also be concluded that the femtocell 20 is poorly located within the premises 18. This can be used to influence the choice of value for the resting maximum transmit power, as mentioned in steps 80 and 86 of FIG. 3, and as described in more detail below. Thus, those users that have not deployed their femtocells correctly could be penalized, compared to users that have deployed their femtocells correctly Having calculated the macro layer RSCP value (from the listen mode and femto UE measurements), it is then possible to calculate the femtocell transmit power that results in a certain macro layer quality at a particular distance from the femtocell. As described in more detail below, this is used to manage the degradation in the macro network key performance indicators (KPIs), for example such as the degradation of High Speed Downlink Packet Access (HSDPA) throughput in an adjacent apartment, or the creation of a downlink dead zone around the femtocell which causes a macro layer user to hand over to another radio access technology (RAT). These can be measured in terms of the percentage of dropped calls, the percentage increase in handovers, the percentage increase in cell reselection, the percentage reduction in HSDPA throughput, or the like. A dropped call, a cell reselection, or a handover, would all be triggered when a macro layer mobile detects that the serving cell CPICH quality has dropped below a certain level, with each function possibly having a different CPICH Ec/Io requirement.

Figure 6:
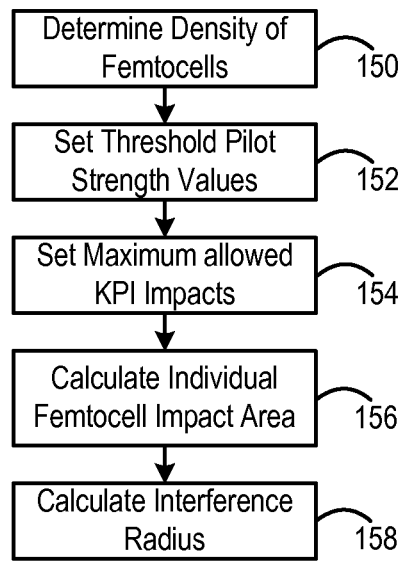
FIG. 6 is a flow chart, illustrating in more detail a part of the process of FIG. 3.
Figure 7:
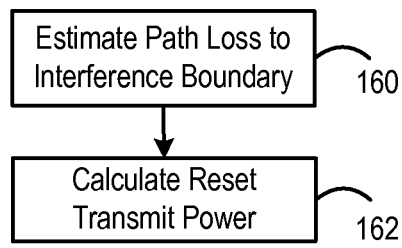
FIG. 7 is a flow chart, illustrating in more detail a part of the process of FIG. 3.

FIG. 6 is a flow chart, illustrating a process whereby the network operator can define an allowed impact on its KPIs from the femtocell population, and FIG. 7 is a further flow chart, illustrating how this can be used to ensure that the impact to the macro network is kept within these limits.

In step 150, the operator determines the expected density of relevant femtocells, for example the number of femtocells per km$^2$, based on the demographics and the expected femtocell market penetration. For example, the number of buildings per unit area can be determined, either by estimating an area of a residential plot, or from planning guidelines, or from knowledge of land usage, but some of these can be ignored as being unsuitable locations for closed access femtocells. The number of suitable residences can then be assumed to be split in some way between the licensed mobile operators. Assumptions can then be made about the proportion of suitable residences that have broadband access of sufficient quality and bandwidth to support femtocell usage, about the number of such premises whose residents own a 3G phone and would be the potential market for femtocells, and about the proportion of such residences that might ultimately deploy a femtocell on a particular UARFCN.

In step 150, the operator could for example use a single deployment density measure for all femtocells, assuming an urban or dense urban demographic profile. Alternatively, based on a subscriber's postal code, the operator could determine whether they are resident in a dense urban, urban or rural area, and use a different assumed average (or typical) density of femtocells in each case.

In step 152, the operator sets thresholds for the pilot strength (CPICH Ec/Io) value at which certain events are triggered. For example, the CPICH Ec/Io value at which an inter-RAT (either 3G and/or 2G) handover is triggered might be set at approximately −14 dB for 3G to 3G handover or −16 dB (or lower) for 3G to 2G handover. Consequently, this could be used as a KPI boundary, in that it could be argued that, if a femtocell within a particular coverage area does not degrade the macro layer below a CPICH Ec/Io of −14 dB or −16 dB then it would not impact the handover or dropped call macro network KPI. Similarly, drive test results for a particular network suggest that the average HSDPA throughput is achieved when the CPICH Ec/Io is greater than or equal to −7 dB. If the femtocell were not to degrade the macro network CPICH Ec/Io below −7 dB outside a particular coverage area, then it would not impact the average macro network HSDPA throughput KPI.

This gives a number of possible ways in which KPIs can be used to define a KPI impact area as a function of the CPICH Ec/Io. In practice, one of these measures is used to determine the impact area, based for example on which services are available on the relevant carrier at that time. For example, if the macro layer carrier does not carry HSDPA data, it would not be appropriate to set the KPI impact area based on the effect on the HSDPA throughput.

In step 154, the operator sets suitable maximum impacts on certain radio access network (RAN) KPIs. For example, in the case of a mature deployment of femtocells, the operator might agree that this could impact the macro network KPIs by causing:

a 0.5% increase in the number of 3G to 2G handovers,
a 1% increase in the number of 3G to 3G handovers, and
a 2% increase in the number of macro layer users who would achieve less than the average HSDPA throughput.

In step 156, the operator calculates the allowed dead zone and/or macro network impact area that an individual femto cell could create, so that, based on the expected density of expected femto cells, it could be effectively guaranteed that the overall impact on the macro network KPIs would be bounded by the above criteria.

Where a total area A contains a number f of femtocells, and each femtocell has an impact area a, the percentage reduction in the effective coverage area of the macro layer, i.e. the percentage reduction in the area over which the relevant KPIs will be met is given by 100·f·a/A.

One example of the calculation suggests that one typical suburban area of 4 km×4 km might contain 1020 femtocells, using the femtocell density calculated above.

Using the maximum impacts set above, a 0.5% increase in the number of 2G to 3G handovers would imply a maximum 0.5% reduction in the macro layer coverage area to a CPICH Ec/Io quality of −16 dB or better, a 1% increase in the number of 3G to 3G handovers would imply a maximum 1% reduction in the macro layer coverage area to a CPICH Ec/Io quality of −14 dB or better, and a 2% reduction in the number of macro network users who may not achieve the average HSDPA throughput or better would imply a 2% reduction in the macro layer coverage area to a CPICH Ec/Io quality of −7 dB or better. Based on the selected criterion, the maximum percentage reduction is determined, and the total allowed "impact area" of all the femtocells must then not be allowed to exceed this maximum percentage of the total area.

In step 158, this impact area is converted into a maximum interference radius for each femtocell.

The specific calculation is as follows:

$$\text{Femto Cell Interference radius} = \sqrt{\frac{\% \text{ area reduction} \cdot (1/\pi) \cdot \text{macro layer area}}{\text{Estimated number of femtocells in that area}}}$$

The interference radius results are presented for the case where there are 1020 femtocells in the 4 km×4 km area, and then for twice this density, in the following table:

| Impact area as % of total area | Boundary radius for a density of 1020 femto cells (m) | Boundary radius for a density of 2040 femto cells (m) |
| --- | --- | --- |
| 2 | 10 | 7.07 |
| 1 | 7.07 | 5.0 |
| 0.5 | 5.0 | 3.53 |

In summary, this approach assumes that there is 100% macro layer coverage prior to deployment of femtocells on that particular UARFCN, and that the only degradation in coverage area is due to the deployment of closed access femtocells. These are pessimistic assumptions, because operators may typically achieve only of the order of 90% outdoor coverage, and there are other factors that reduce coverage (e.g.: dead zones caused by basestations on adjacent carriers deployed by other operators). However using these assumptions provides an upper bound in terms of macro layer KPI impact.

Once the allowed interference radius is defined by the management system 28 of the mobile network, this can be transmitted to each individual femtocell, and can be used by the femtocell in steps 72 and 94 of the process shown in FIG. 3, for comparison with the estimate of the distance of the macro layer user from the femtocell. If the macro layer user is within the interference radius, it is then possible to further reduce the femtocell maximum downlink transmit power to meet the KPI boundary conditions, as described in steps 74 and 96 of the process shown in FIG. 3. This reduction can be gradual, as the macro layer UE comes closer to the femtocell 20, or it can be immediate, as soon as the macro layer UE comes within the interference radius.

As the macro layer user moves out of the region, so the femtocell would increase its transmit power back to its original value as it is deemed to no longer create a dead zone.

The reset transmit power, that is applied by the femtocell 20 in steps 74 and 96 in FIG. 3 is calculated on the worst-case assumptions that no femtocell is carrying traffic, and that they all experience uplink interference at the same time. The reset transmit power, i.e. the minimum transmit power level that the femtocell drops to, is then set such that, even in this worst-case situation, the impact on the macro network KIPs is within the bounds set above. Once the macro layer user moves out of the interference boundary, i.e. when the estimated distance to the macro layer user becomes larger than the interference radius in step 72 or step 94, the femtocell restores its transmit power level to its level before the interference event.

FIG. 7 shows the process for calculating this reset transmit power. In step 160, the femtocell 20 estimates the path loss to the interference boundary, i.e. at the interference radius calculated above. This path loss is referred to below as the fifth path loss PL5. Thus, at power up the femtocell scans the surrounding macro layer and as such can measure the macro layer RSCP of the highest power macro network. The femtocell also continues to measure the macro network RSCP levels in use. These samples can be averaged to obtain a mean macro layer RSCP level in close proximity to the femto cell. This is known as Local Macro Layer RSCP.

Knowing the interference boundary radius, as described above, it is then possible to estimate the path loss to the interference boundary using the path loss model also used above.

Having estimated the path loss PL5 to the interference boundary, and knowing the allowed macro layer CPICH Ec/Io at the interference boundary, it is possible in step 162 to set the femto cell reset transmit power. Firstly, the femto cell CPICH reset transmit power is determined from the following equation:

Femto CPICH Reset Power=Local Macro Layer RSCP+PL5−Femto Power Delta where Femto Power Delta is approximately the macro layer CPICH Ec/Io at the interference boundary. Thus, the lower the absolute value, the lower the femtocell reset transmit power is allowed to be.

Since the femtocell CPICH power is typically set at 10% of the total femtocell power, it is therefore possible to define the maximum femtocell total transmit power.

As an illustrative example of the reset transmit power calculation, if the interference radius is 7 m, this gives a value of PL5 of 62 dB. If the macro layer CPICH Ec/Io boundary=−14 dB, and the average Local Macro Layer RSCP level is −100 dBm, then the femto cell CPICH Tx power would be set at:

$$\text{Femto } CPICH \text{ Reset Power} = -100 \text{ dBm} + 62 \text{ dB} + 14 \text{ dB}$$

$$= -24 \text{ dBm},$$

with a reset total transmit power of −14 dBm.

Thus, the use of the reset transmit power can keep the impact of the femtocell population on the macro layer KPIs within predefined limits.

Test results, in the case of a femtocell straddling two UMTS carriers suggests that a modulation (or reduction) of the downlink transmit power of the femtocell, of the order of approximately 5 dB from the converged total DL transmit power, would be sufficient in order to achieve the dead zone radii defined above. In the event that an operator deploys the femtocell on the same UARFCN as the macro network, then the required modulation (or reduction) of the downlink transmit power of the femto cell would probably be of the order of 15 dB to 20 dB from the converged total DL transmit power in order to achieve the dead zone radii results defined above. This clearly demonstrates the advantages of combined carrier straddling and uplink noise monitoring as a method of meeting the operator macro network KPIs.

As described so far, the method is concerned with maintaining key performance indicators that affect macro layer users, and will be measurable by the network. Similarly, a femtocell can also measure and report its own KPIs and a user of a femto cell which is repeatedly suffering the effects of downlink power constraining could be recommended, for example through an email or SMS message as described in steps 76 and 98 of the process in FIG. 3, to relocate the unit. A relocation of a femtocell by a few meters, for example away from near a window, may be all that is required to correct the macro layer user interference effects.

As mentioned above, the present method also includes steps to reduce the maximum downlink transmit power of the femtocell basestation to a resting transmit power, for example when the femtocell is carrying only idle traffic and may be interfering with active users on the macro layer, or when the femtocell is carrying no traffic.

One study, published at 3GPP R4-071660 "Impact of HNB with fixed output power on macro HSDPA capacity", analyses the capacity impacts on the macro network caused by a deployment of femtocells. In calculating the resting transmit power, we can make the worst case assumption that no traffic is being carried by the femtocell population, and hence that the femtocells are purely generators of interference. Using the information given above about demographics, the number of network operators and possible market penetration, a maximum likely number of femtocells per macro (node B/sector) can be determined to be of the order of 150 to 200 femtocells. Then, if an operator requires to limit the average indoor HSDPA throughput capacity impact to less than 2% to 3%, then this study suggests that this would be achieved if the total co-channel population of femtocells set a maximum transmit power to −10 dBm. If, instead, the femtocells are deployed on a carrier between the two UMTS carriers used in the rest of the network, test results suggest that there would be an interference margin gain of approximately 12 to 15 dB. A resting transmit power of +5 dBm for this deployment scenario should therefore be adequate.

As described in steps 78 and 80 of the process of FIG. 3, the transmit power is reduced to the resting power level when a time threshold is reached. The time threshold is set on the basis of information about the traffic profile of the femtocell, such as knowledge of the typical duration of calls made through the femtocell, time of day when calls are made, type of calls made, etc. For example a femtocell that carries low traffic levels might set a short time threshold for use in step 78 of the process (for example one minute or less, perhaps 20 to 30 seconds), and might move into the resting transmit power state in step 80 when this time has elapsed after all mobiles have decamped. Meanwhile, a femtocell that carries significant traffic may set a longer time threshold, for example tens of minutes. In addition, a more heavily used femtocell might not decrease its maximum transmit power to the resting power immediately when the time threshold is reached, but might decrease its maximum transmit power gradually or in stages.

Figure 8:
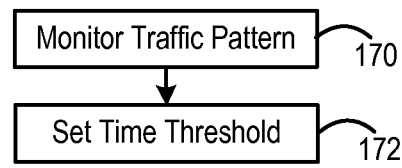
FIG. 8 is a flow chart, illustrating in more detail a part of the process of FIG. 3.

FIG. 8 shows a process performed in the femtocell 20. In step 170, the femtocell monitors its traffic pattern, and in step 172 the femtocell sets its time threshold on the basis of the traffic pattern. For example, the time threshold may be chosen from two or more preset values. Where there are two possible values, the femtocell might simply decide whether the number of calls made and/or received through the femtocell is above an activity threshold, and may set the longer time threshold if the level of traffic is above that activity threshold. Alternatively, the decision might be based on the time of day, and reflect the number of calls typically made and/or received through the femtocell at that time of day, for example.

Other arrangements with a larger number of available preset values for the time threshold are also possible.

There are thus described methods for reducing the effects of interference caused by femtocells to macro layer users.

The invention claime is:

1. A method of controlling a downlink power in a femtocell, the method comprising:
   determining an expected area density of femtocells;
   setting a macro layer quality criterion;
   setting a network performance indicator impact level;
   calculating a maximum impact area allowed for the femtocell, based on the expected area density of femtocells, the macro layer quality criterion, and the network performance indicator impact level;
   estimating a distance of a macro layer user from the femtocell; and
   controlling the downlink power in the femtocell based on the estimated distance of the macro layer user from the femtocell and based on the calculated maximum impact area.

2. A method as claimed in claim 1, wherein the step of controlling the downlink power in the femtocell based on the estimated distance of the macro layer user from the femtocell and based on the calculated maximum impact area is performed when the femtocell has only idle traffic.

3. A method as claimed in claim 1, wherein the step of controlling the downlink power in the femtocell based on the estimated distance of the macro layer user from the femtocell and based on the calculated maximum impact area is performed when the femtocell is carrying no traffic, and when the femtocell detects a nearby macro layer user.

4. A method of controlling a downlink power in a femtocell, the method comprising:
   estimating a distance of a macro layer user from the femtocell;
   determining whether the estimated distance is within an interference radius, the interference radius being determined on the basis of an expected area density of femtocells and a network performance indicator impact level; and
   when the estimated distance is within the interference radius, controlling the downlink power in the femtocell to a first predetermined power level.

5. A method as claimed in claim 4, comprising setting the first predetermined power level by:
   determining an estimated path loss from the femtocell to the interference radius;
   measuring a signal strength of transmissions from a macro layer basestation; and
   setting the first predetermined power level on the basis of the estimated path loss from the femtocell to the interference radius and the measured signal strength of the transmissions from the macro layer basestation.

6. A method as claimed in claim 5, comprising setting the first predetermined power level by:
   determining a femto CPICH (Common Pilot Channel) reset transmit power substantially according to the equation:

Femto CPICH Reset Power=Local Macro Layer RSCP+PL5−− Femto Power Delta where Local Macro Layer RSCP (Received Signal Code Power) is the measured signal strength of the transmissions from the macro layer basestation;

PL5 (Pathloss 5) is the estimated path loss from the femtocell to the interference radius to the interference boundary;

Femto Power Delta is approximately the macro layer CPICH Ec/Io at the interference boundary; and determining the first predetermined power level on the basis of a known ratio of the femtocell CPICH power to the total femtocell power.

7. A method as claimed in claim 4, comprising:
first determining first determining that the femtocell is carrying no traffic, and detecting an active macro layer user nearby.

8. A method as claimed in claim 4, comprising:
first determining that the femtocell is carrying only idle traffic, and detecting multiple registration requests from a macro layer user.

9. A femtocell basestation, adapted to
estimate a distance of a macro layer user from the femtocell;
determine whether the estimated distance is within an interference radius, the interference radius being determined on the basis of an expected area density of femtocells and a network performance indicator impact level; and
when the estimated distance is within the interference radius, control the downlink power in the femtocell to a first predetermined power level.

10. A femtocell basestation as claimed in claim 9, further adapted to:
determine an estimated path loss from the femtocell to the interference radius;
measure a signal strength of transmissions from a macro layer basestation; and
set the first predetermined power level on the basis of the estimated path loss from the femtocell to the interference radius and the measured signal strength of the transmissions from the macro layer basestation.

11. A femtocell basestation as claimed in claim 10, further adapted to set the first predetermined power level by:
determining a femto CPICH (Common Pilot Channel) reset transmit power substantially according to the equation:

Femto CPICH Reset Power=Local Macro Layer RSCP+PL5−Femto Power Delta where Local Macro Layer RSCP (Received Signal Code Power) is the measured signal strength of the transmissions from the macro layer basestation;

PL5 (Pathloss 5) is the estimated path loss from the femtocell to the interference radius to the interference boundary; and Femto Power Delta is approximately the macro layer CPICH Echo at the interference boundary; and determine the first predetermined power level on the basis of a known ratio of the femtocell CPICH power to the total femtocell power.

12. A femtocell basestation as claimed in claim 9, further adapted to:
first determine that the femtocell is carrying no traffic, and detect an active macro layer user nearby.

13. A femtocell basestation as claimed in claim 9, further adapted to:
first determine that the femtocell is carrying only idle traffic, and detect multiple registration requests from a macro layer user.

14. A method of controlling a downlink power in a femtocell, the method comprising:
when the femtocell stops carrying any traffic, reducing the downlink power of the femtocell to a resting power level after a time threshold has expired,
the method further comprising the step of:
setting the time threshold based on an activity level of the femtocell.

15. A method as claimed in claim 14, wherein setting the time threshold comprises:
determining whether the activity level of the femtocell exceeds an activity threshold;
if the activity level of the femtocell exceeds the activity threshold, setting the time threshold to a first time threshold; and
if the activity level of the femtocell does not exceed the activity threshold, setting the time threshold to a second time threshold shorter than the first time threshold.

16. A femtocell basestation, adapted to:
when the femtocell stops carrying any traffic, reduce the downlink power of the femtocell to a resting power level after a time threshold has expired; and
set the time threshold based on an activity level of the femtocell.

17. A femtocell basestation as claimed in claim 16, further adapted to set the time threshold by:
determining whether the activity level of the femtocell exceeds an activity threshold;
if the activity level of the femtocell exceeds the activity threshold, set the time threshold to a first time threshold; and
if the activity level of the femtocell does not exceed the activity threshold, set the time threshold to a second time threshold shorter than the first time threshold.

18. A femtocell basestation adapted to:
determine an expected area density of femtocells;
set a macro layer quality criterion;
set a network performance indicator impact level;
calculate a maximum impact area allowed for the femtocell, based on the expected area density of femtocells, the macro layer quality criterion, and the network performance indicator impact level;
estimate a distance of a macro layer user from the femtocell; and
control the downlink power in the femtocell based on the estimated distance of the macro layer user from the femtocell and based on the calculated maximum impact area.

19. A femtocell basestation as claimed in claim 18, further adapted to only control the downlink power in the femtocell based on the estimated distance of the macro layer user from the femtocell and based on the calculated maximum impact area when the femtocell has only idle traffic.

20. A femtocell basestation as claimed in claim 19, further adapted to only control the downlink power in the femtocell based on the estimated distance of the macro layer user from the femtocell and based on the calculated maximum impact area when the femtocell is carrying no traffic, and when the femtocell detects a nearby macro layer user.

* * * * *